Feb. 8, 1927. 1,616,671
J. D. SMITH ET AL
SEALING MACHINE
Filed Oct. 26, 1923   8 Sheets-Sheet 1

J. D. Smith
C. R. Phillips
INVENTOR

BY Victor J. Evans
ATTORNEY

Feb. 8, 1927.  J. D. SMITH ET AL  1,616,671
SEALING MACHINE
Filed Oct. 26, 1923    8 Sheets-Sheet 4
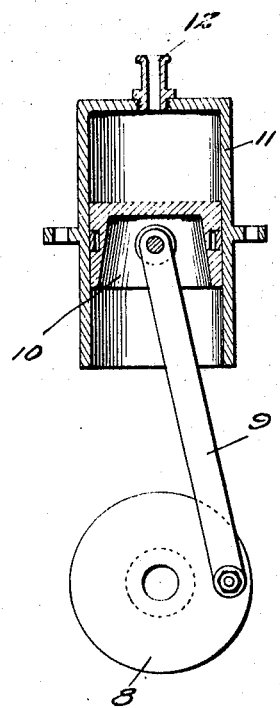
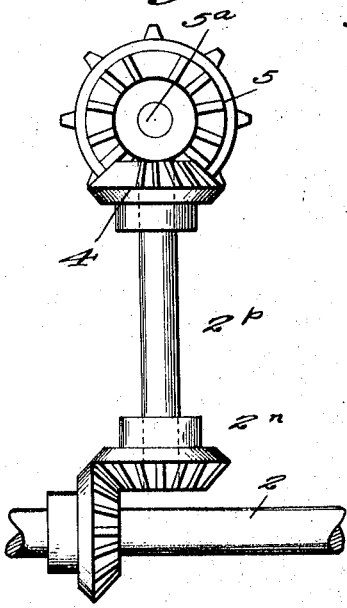
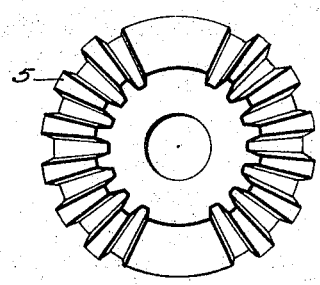
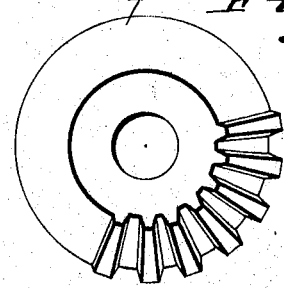
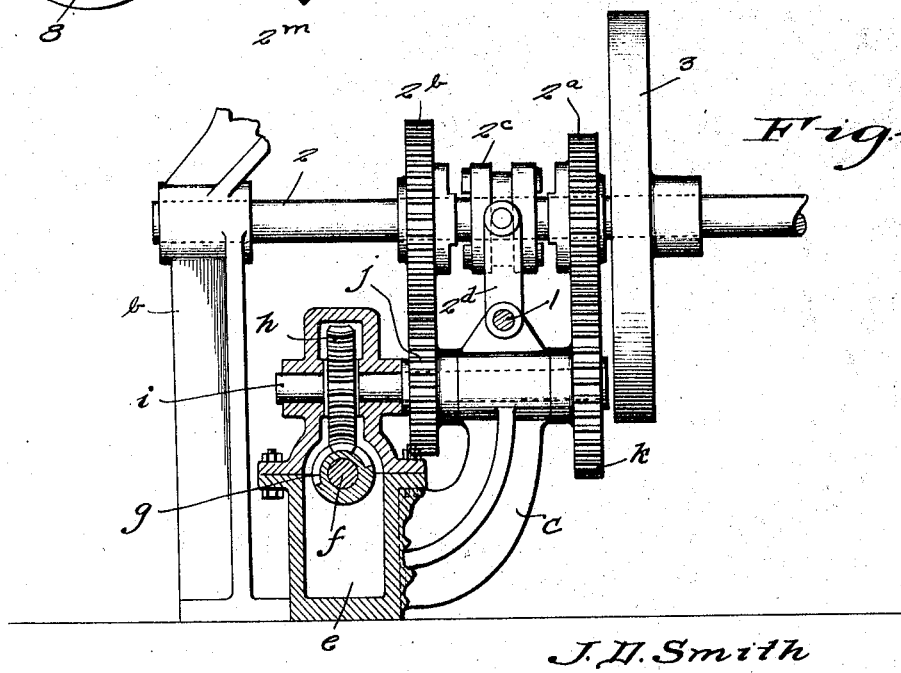
J. D. Smith
C. R. Phillips   INVENTOR
BY Victor J. Evans
ATTORNEY
WITNESSES

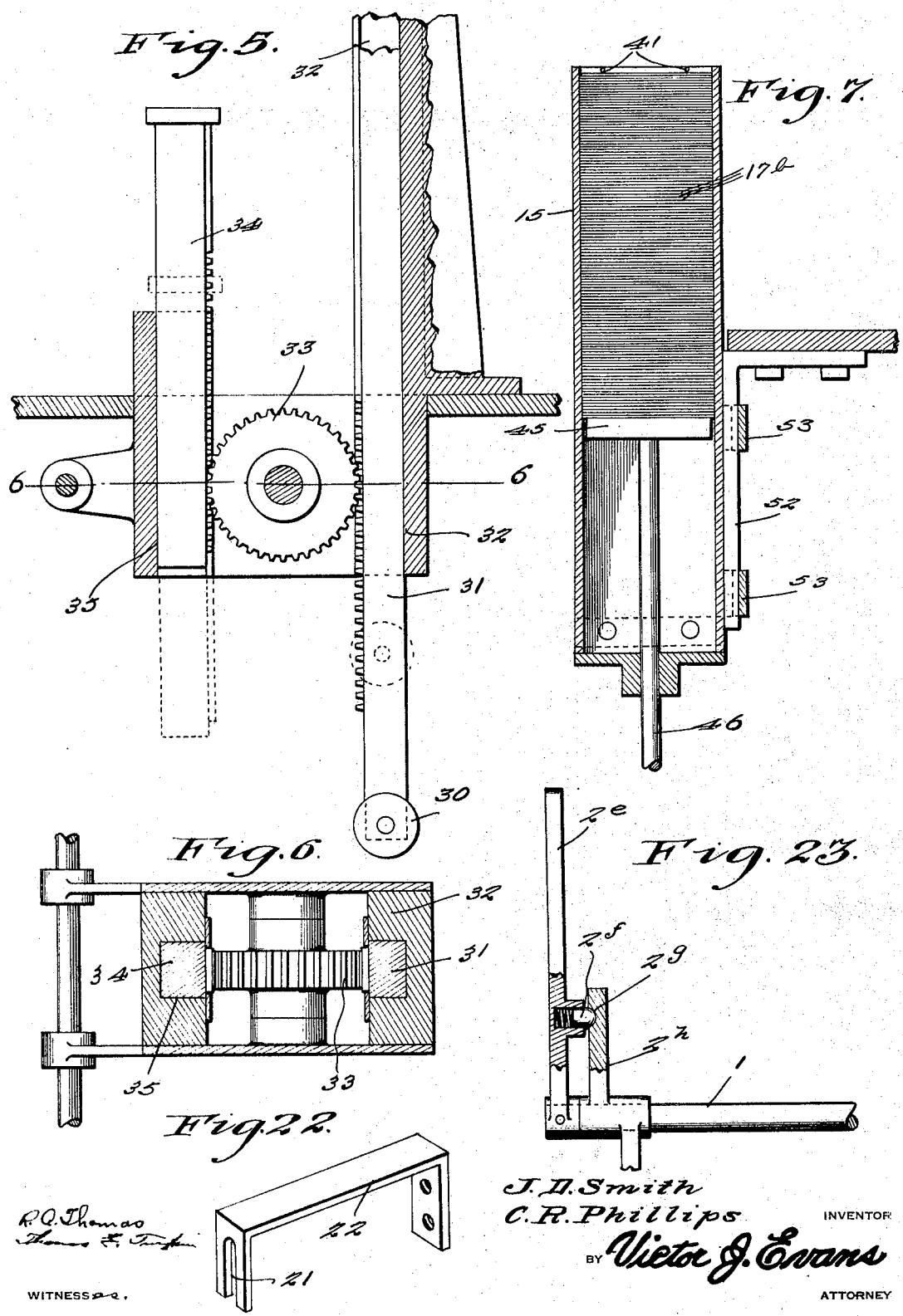

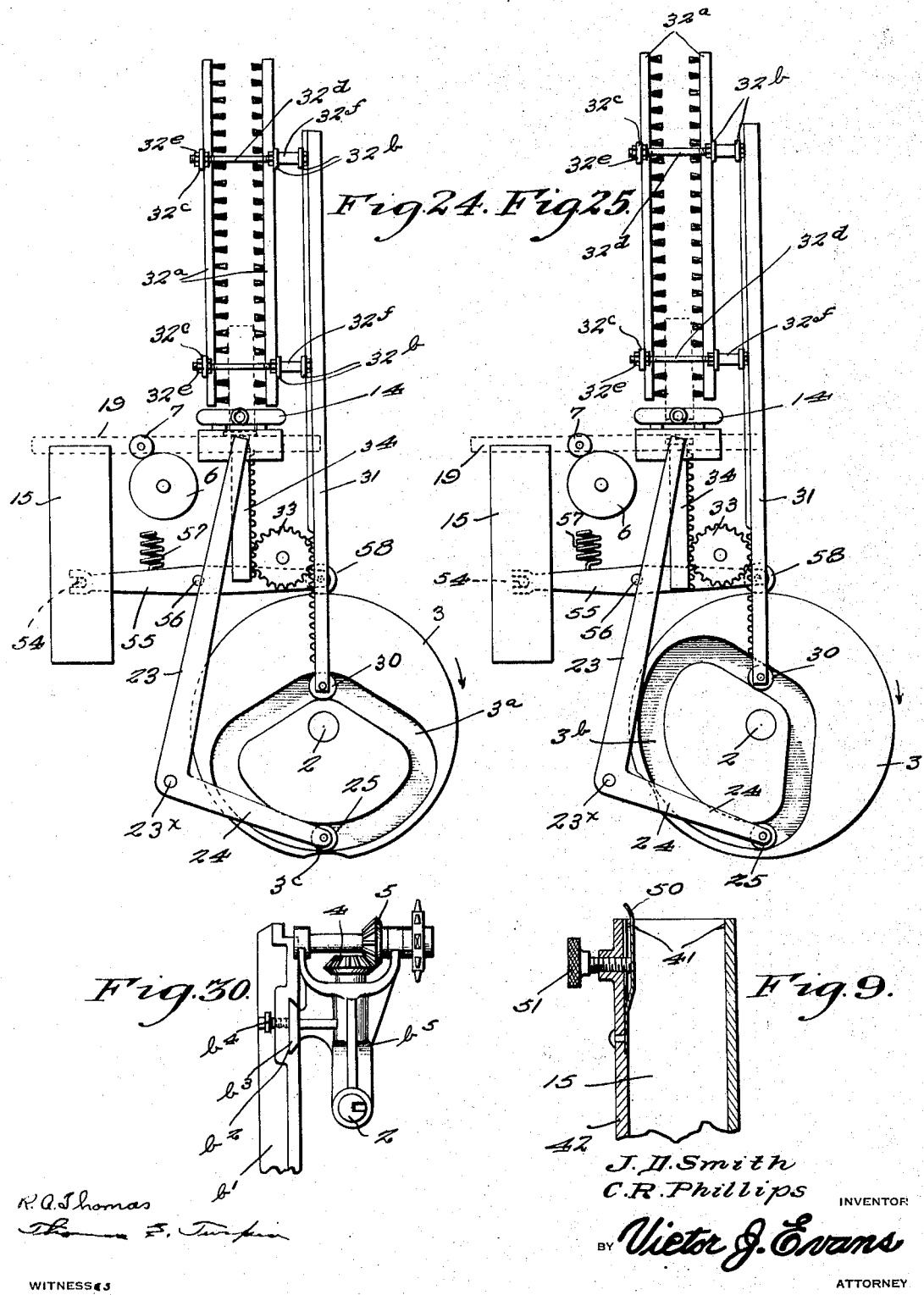

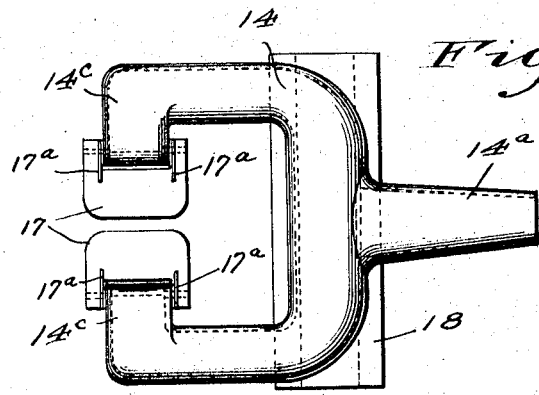
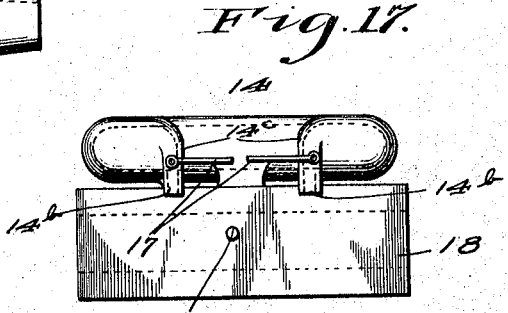
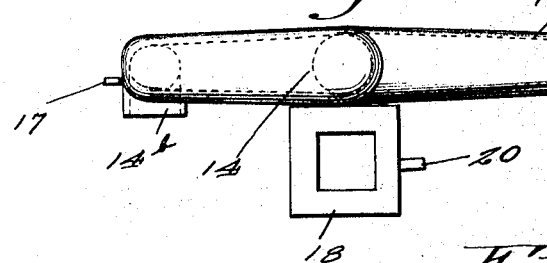
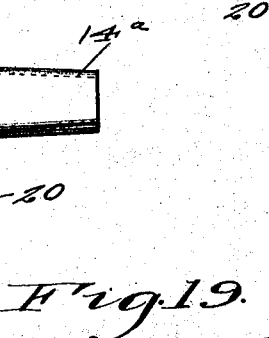
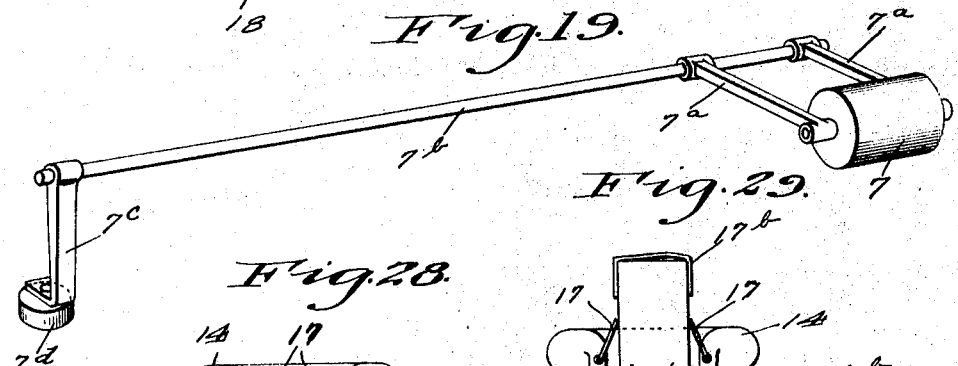
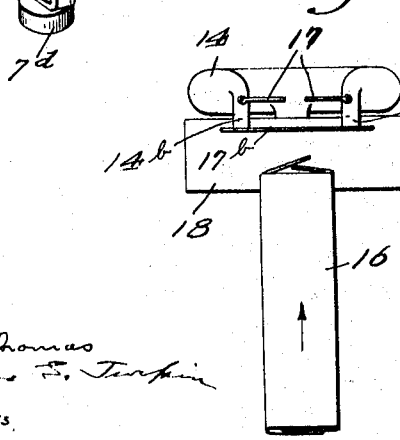
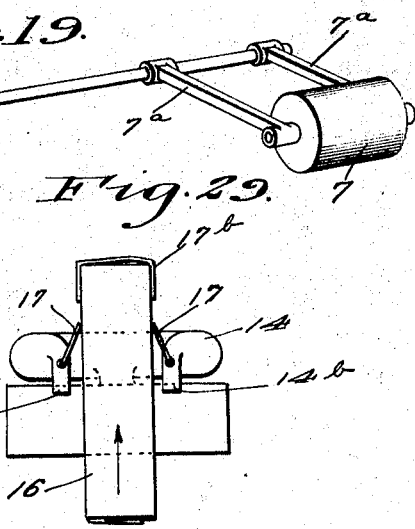

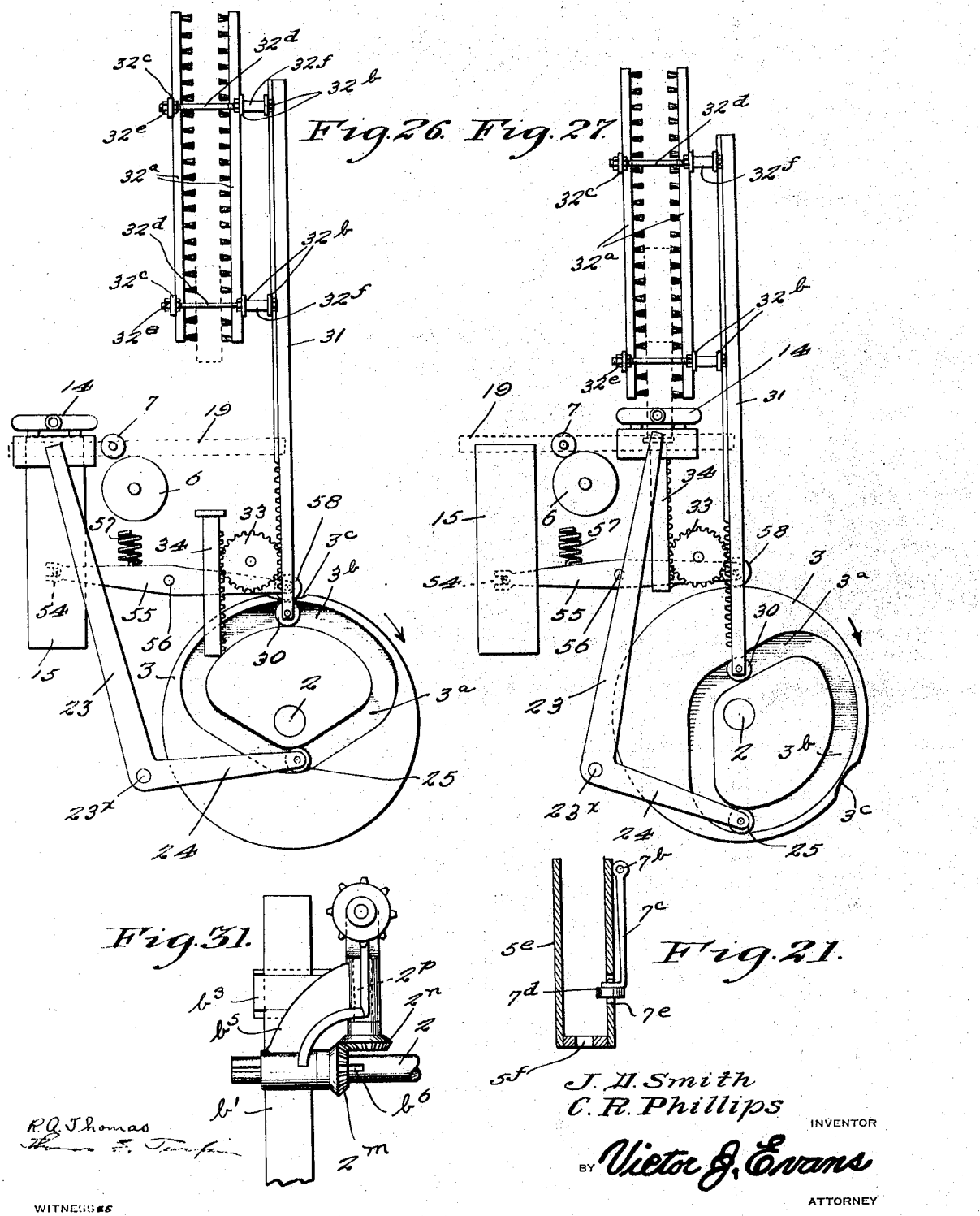

Patented Feb. 8, 1927.

1,616,671

UNITED STATES PATENT OFFICE.

JOHN D. SMITH AND CHARLES R. PHILLIPS, OF RICHMOND, VIRGINIA, ASSIGNORS OF ONE-THIRD TO WILLIAM F. LEE AND THOMAS JARDINE, BOTH OF RICHMOND, VIRGINIA.

SEALING MACHINE.

Application filed October 26, 1923. Serial No. 670,958.

Our present invention pertains to machines for sealing packages, and it has for its general object the provision of a simple, compact, reliably operating and highly efficient machine for sealing packages by the application of strips thereto, the strips in one use of the machine being revenue stamps that it is necessary to apply to the packages, so that the sealing and stamp affixing are accomplished in one and the same operation.

To the attainment of the foregoing, the invention consists in the machine and in certain combinations of elements comprised in the machine as hereinafter described and definitely pointed out in our appended claims, the whole organization being automatic in operation.

In the accompanying drawings, accompanying and forming part of this specification:—

Figure 4 is an enlarged detail view illustrative of a portion of the driving mechanism of the machine.

Figure 5 is an enlarged detail vertical section illustrative of the mechanism for moving the packages to be sealed and the brushes vertically.

Figure 6 is a horizontal section taken in the plane indicated by the line 6—6 of Figure 5.

Figure 7 is a vertical section taken through the stamp holder in the plane indicated by the line 7—7 of Figure 1.

Figure 8 is a top view of the stamp holder, showing certain appurtenances thereof hereinafter explicitly referred to.

Figure 9 is a detail vertical section of the upper portion of the stamp holder.

Figure 12 is a sectional view showing the cylinder and piston for use in the handling of the stamps.

Figures 13, 14 and 15 are enlarged views showing the gears employed in the intermittent movement of the conveyor for moving packages along the horizontal guideway of the machine.

Figures 16, 17 and 18 are enlarged detail views of the stamping member of the machine, Figure 16 being a plan view, Figure 17 a view of the inner end of the member, and Figure 18 a side elevation of the same.

Figure 19 is an enlarged detail perspective showing the roller by which glue is applied to the stamps and the movable parts with which said roller is associated.

Figure 20 comprises disconnected perspectives of the shaft coupling members complementary to the glue box which glue box is preferably removable for reasons hereinafter set forth.

Figure 21 is a vertical transverse section on an enlarged scale showing the guideway for the packages to be sealed and also showing the relation to said guideway of the control arm on the rock shaft of the glue applying roller.

Figure 22 is a detail perspective of the element 22 comprised in the mechanism.

Figure 23 is an enlarged detail view of the selective mechanism whereby the speed of the machine may be increased or diminished.

Figure 1:
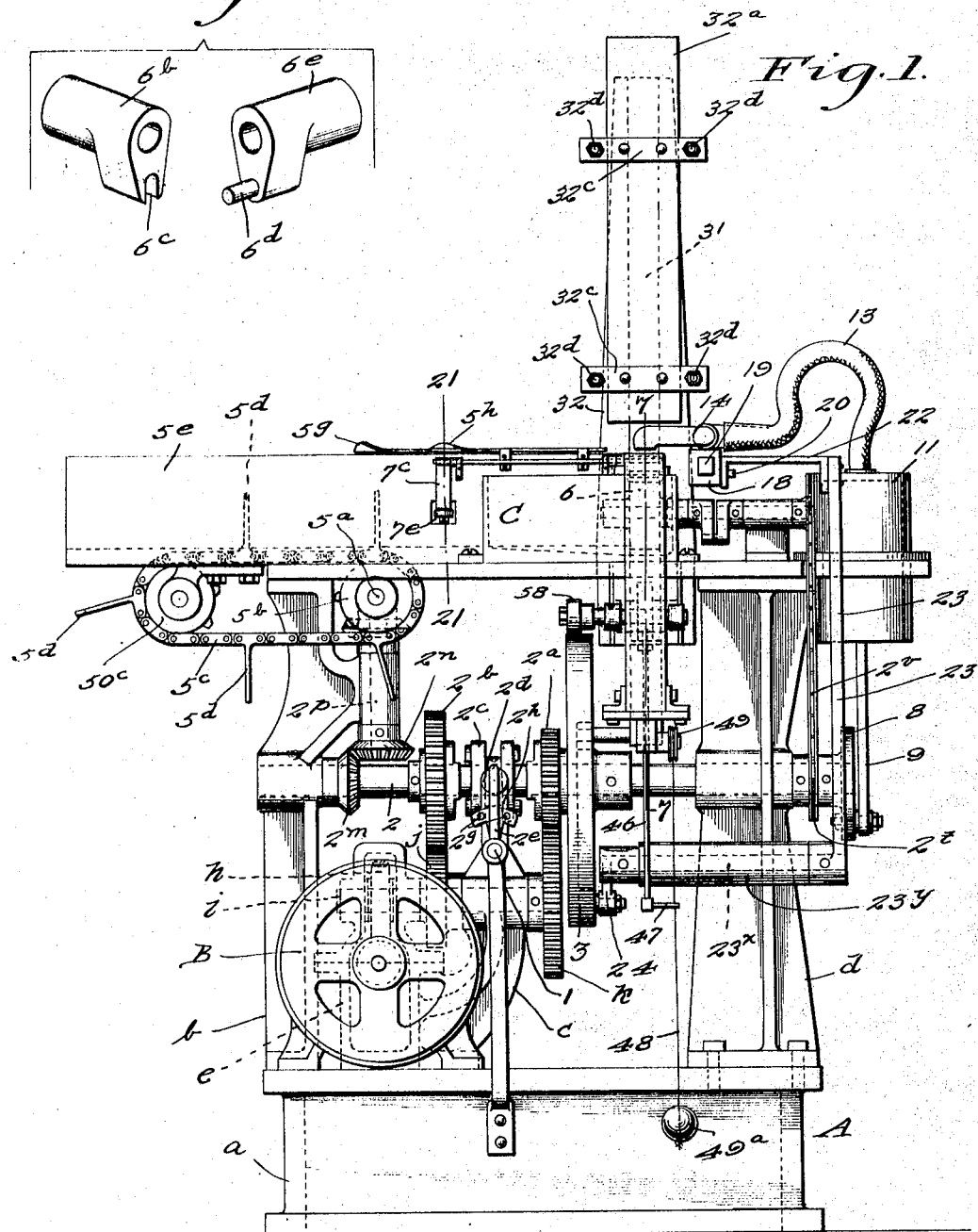
Figure 1 is a side elevation of a machine constituting one embodiment of our invention.
Figure 2:
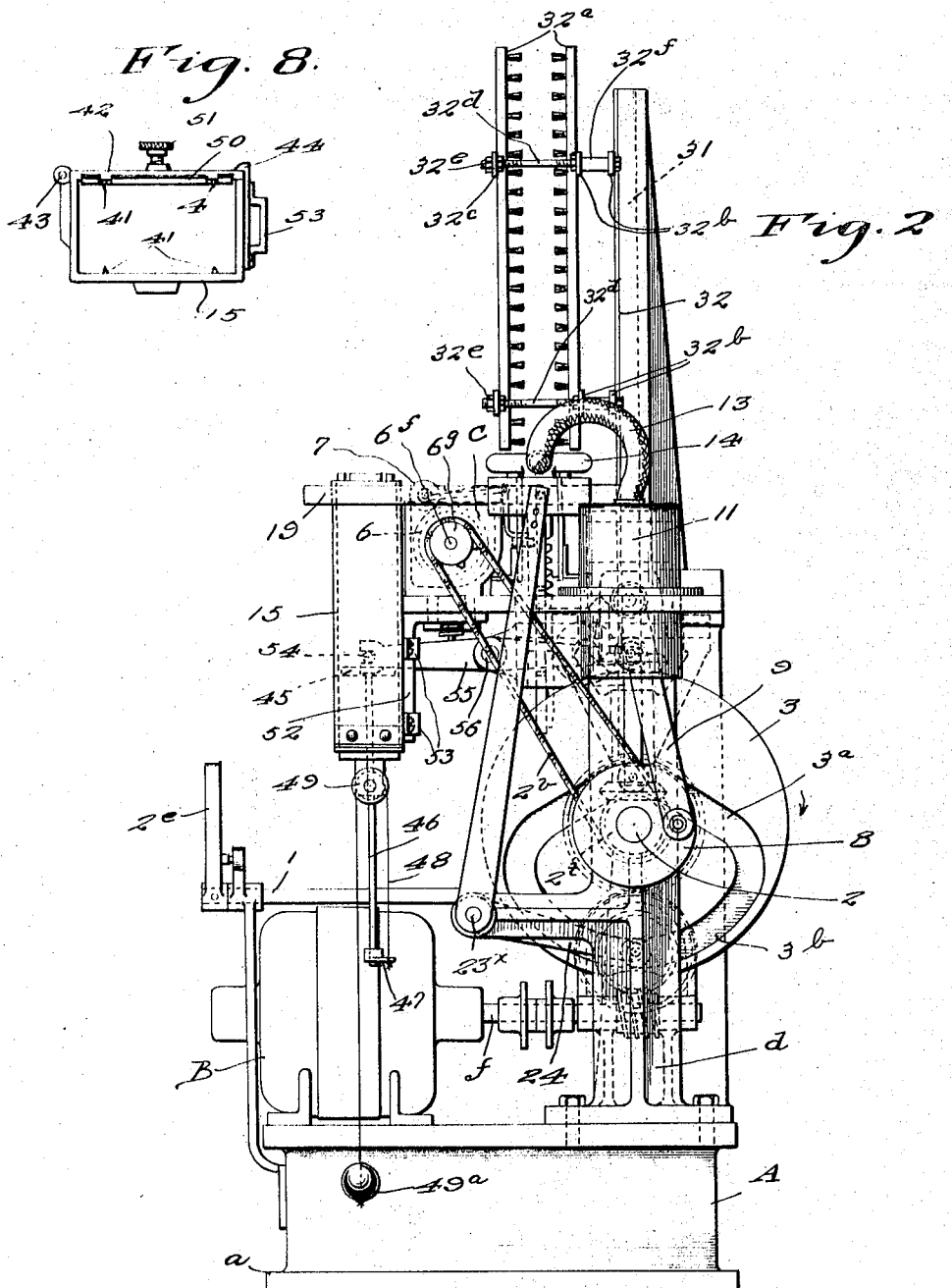
Figure 2 is an end elevation of the same.
Figure 3:
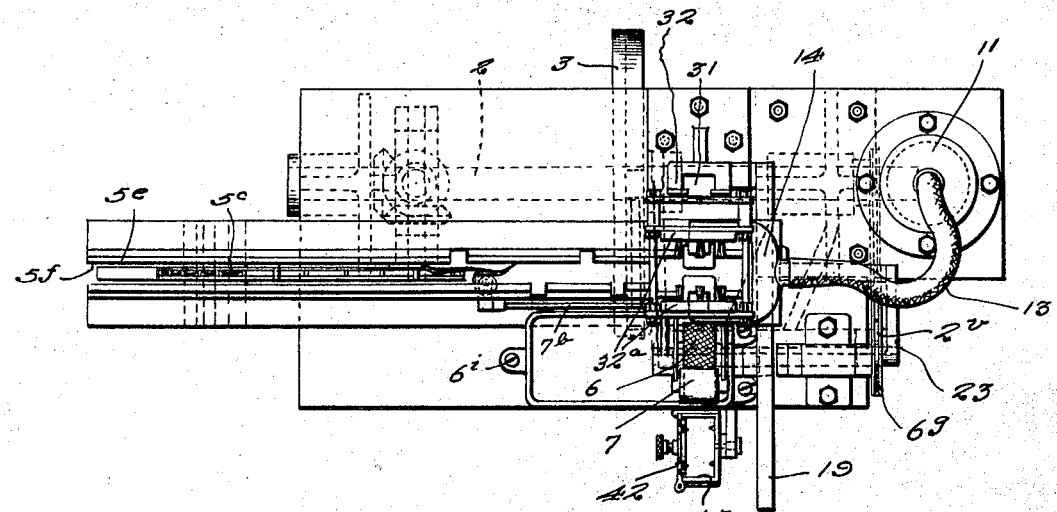
Figure 3 is a plan view of the machine.

Figures 24, 25, 26 and 27 are diagrammatic views taken crosswise of the machine as shown in Figure 1, and illustrating the movements of the parts having to do with the application of stamps to and sealing of packages by the said application of stamps.

Figures 28 and 29 are diagrammatic views showing the relation of a package to the stamping member of the machine.

Figures 30 and 31 are detail views of a modification hereinafter explicitly referred to, Figure 31 being a view at right angles to Figure 30.

Similar letters and numerals of reference designate corresponding parts in Figures 1 to 29 of the drawings to which reference will first be made.

The main frame A of the machine may be of the construction illustrated or of any other construction compatible with the purpose of our invention, the illustrated construction comprising a base $a$ and uprights $b$, $c$ and $d$, all fixed with respect to the base $a$ as is also a housing $e$, Figure 4, formed integral with the upright $c$. At B is an electric motor, and this motor has an armature shaft $f$ partly arranged in the said housing $e$ and provided with a worm $g$ meshed with a worm gear $h$, said worm $g$ and worm gear $h$ being entirely in the said housing $e$, and the worm gear $h$ being appropriately fixed to a shaft $i$ journaled partly in the housing $e$ and partly in the upright $c$. Fixed to the shaft $i$ and disposed at opposite sides of the upright $c$ are spur gears $j$ and $k$, the gear $k$ being larger in diameter than the gear $j$ in about the proportion illustrated in Figure 4. Bearing in the upper portion of the upright $c$, Figures 1 and 4, is a rock shaft 1, and journaled in the uprights $b$ and $d$ is a countershaft 2 on which is appropriately fixed a cam 3. Loosely mounted on the countershaft 2 and held against lateral movement thereon are spur gears $2^a$ and $2^b$, meshed with the gears $k$ and $j$, respectively. Splined on the countershaft 2 is a clutch member $2^c$ for cooperation with the clutch members on the inner sides of the gears $2^a$ and $2^b$ so as to fix one of said gears or the other to the countershaft 2 according to the speed at which it is desired to rotate the said countershaft 2. The said clutch member $2^c$ is engaged by a yoke $2^d$ fixed on and movable with the rock shaft 1, and at its outer end the said rock shaft 1 is provided with a hand lever $2^e$ by which is carried a spring pressed detent $2^f$ for cooperation with indentures $2^g$ in a bracket $2^h$, Figures 1 and 23 on the upright $c$. This provision enables the operator of the machine to place the clutch member $2^c$ in engagement with the clutch face of the gear $2^a$ when it is desired to drive the countershaft 2 at a comparatively high rate of speed, and also enables the operator to place the clutch member $2^c$ in engagement with the clutch face of the gear $2^b$ when it is desired to drive the countershaft 2 at a comparatively low rate of speed, and when the detent $2^f$ is seated in the central indenture $2^g$, it will be manifest that the clutch member $2^c$ will be maintained in neutral position so that motion will not be transmitted to the countershaft 2. While the detent $2^f$ is in cooperation with any one of the three indentures $2^g$ may be depended upon to hold the clutch member $2^c$ against casual movement lengthwise of the shaft 2. It will be readily understood, however, that by the application of a little stress to the handle lever $2^e$, the detent $2^f$ may be displaced from any one of the said indentures.

The cam 3 is provided in one side with a groove $3^a$, a considerable portion $3^b$ of which is concentric with the center of movement of the cam, and it will also be observed that the cam 3 is provided in its periphery with a depression $3^c$.

Appropriately fixed to the countershaft 2 and arranged at left to the gear $2^b$ in Figure 1 is a miter gear $2^m$, intermeshed with a miter gear $2^n$ on an upright shaft $2^p$ journaled in a portion of the upright $b$. At its upper end said shaft $2^p$ is provided with a mutilated gear 4, shown in detail in Figure 15, and arranged for cooperation with a vertical mutilated gear 5 on a conveyor shaft $5^a$, Figures 1, 13, 14 and 15. The gear 4 is provided with a single set of teeth and with a smooth portion between the ends of said set of teeth of a considerable length, while the gear 5 is provided with two sets of teeth separated by intervening smooth portions which are comparatively short. From this it follows that incident to the rotation of the shaft $2^p$, the shaft $5^a$ will be caused to dwell twice during each complete revolution of the gear 4. The shaft $5^a$ carries a sprocket gear $5^b$, and mounted on said gear $5^b$ is a sprocket belt $5^c$ equipped at intervals in its length with follower fingers $5^d$, the purpose of which is to move packages before them in the guideway $5^e$, Figures 1 and 21. It will also be noted that the sprocket belt $5^c$ is trained around an idler sprocket gear $50^e$, and that the fingers $5^d$ are preferably arranged a much greater distance apart than each of the packages to be sealed is wide. The described intermittent movement of the conveyor belt $5^c$ is advantageous for reasons which will appear herein in connection with the description of other parts of the mechanism, and at this point we would have it understood that the guideway $5^e$ and the conveyor belt $5^c$ may be of different lengths, and the said conveyor belt $5^c$ may be provided with an appropriate number of follower fingers $5^d$. For the movement of the follower fingers $5^d$ in the guideway $5^e$, the said guideway $5^e$ is provided in its bottom with a longitudinal slot $5^f$.

The packages to be sealed are moved step by step and in succession in the guideway $5^e$ toward the right in Figure 1, the said packages which are then filled with cigarettes being open at their upper ends. Therefore, as the packages are moved toward the right in the guideway $5^e$ it is first necessary to close the upper end of each package. This function is performed by folding members $5^g$ and $5^h$ appropriately attached to the upper portion of the guideway $5^e$, the member $5^g$ being adapted to engage and depress one portion of the upwardly extended tinfoil of the package, and the member $5^h$ being adapted to engage and depress the other portion of the extended tinfoil so that the last-named portion rests in the completion of the closure on the first-named portion.

Figure 10:
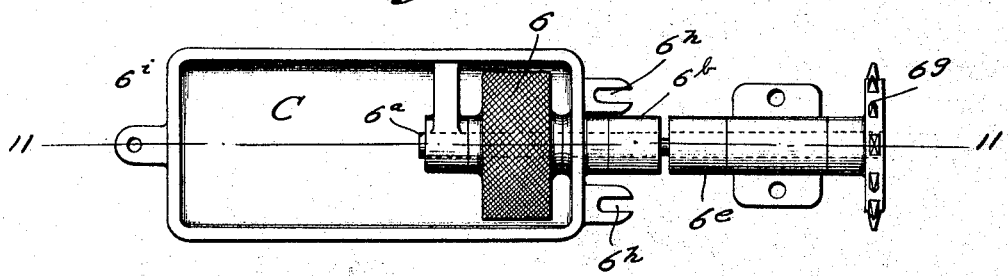
Figure 10 is a top plan view of the glue box and certain elements with which the same is associated.
Figure 11:
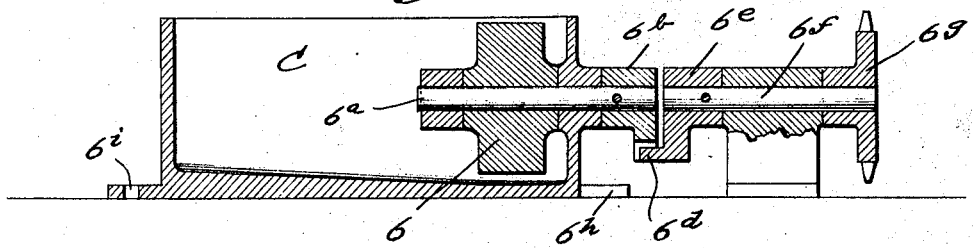
Figure 11 is a vertical section taken in the plane indicated by the line 11—11 of Figure 10.

At C is the glue box of the machine, the said box being best shown in Figures 10 and 11. In the box C is a roller 6, preferably of brass and provided with a knurled periphery as shown in Figure 10. The said roller 6 is appropriately fixed on a shaft $6^a$, and at $6^b$ and without the box C the shaft $6^a$ is provided with a coupling member, Figures 10, 11 and 20, the said coupling member being kerfed at $6^c$ for the reception of a stud $6^d$ on a coupling member $6^e$ fixed to a shaft $6^f$ on which is also fixed a sprocket gear $6^g$ for the transmission of rotary motion to the shaft $6^f$, and consequently through the coupling members $6^b$ and $6^e$ to the shaft $6^a$ and the roller 6. The glue box C is detachably engaged with the main frame of the machine at the points $6^h$, the bifurcated lugs and the studs illustrated being provided for said purpose, and the glue box is also detachably connected to the frame at the point $6^i$. Thus the glue box may be expeditiously and easily removed with its roller 6, shaft $6^a$ and coupling member $6^b$ from the machine and may as readily be replaced with a fresh glue box similarly equipped, the rear and forward endwise movements of the glue box C serving to disengage and engage the coupling members $6^b$ and $6^e$ so that when either glue box is in proper relative position the shaft $6^a$ will be driven from the shaft $6^f$. As is well known to those skilled in the art to which this invention pertains it is necessary to frequently change the glue boxes, and it will be manifest that our novel construction best shown in Figures 10 and 11, lends itself to quick changing of the glue boxes so that the machine need be out of operation but a very short time.

The shaft $6^f$ is driven from the countershaft 2 through the medium of a sprocket gear $2^t$ fixed on the shaft 2 and a sprocket belt $2^v$ which is mounted on the sprocket gear $2^t$ and the before mentioned sprocket gear $6^g$.

Also fixed on the countershaft 2 is a crank disk 8 connected by a pitman 9 with a reciprocatory piston 10 in a cylinder 11, Figures 1 and 12. When reciprocated by the rotation of the countershaft 2 the piston 10 is designed to alternately force and draw air through a nipple 12 with which the cylinder 11 is equipped. The said nipple 12 is connected to a hose or flexible conduit 13, and the said hose or flexible conduit 13 is connected, in turn, to the nipple $14^a$ of a stamping member 14, shown in detail in Figures 16, 17 and 18. Said stamping member 14 is of general hollow form for the passage of air and is provided with spaced nozzles $14^b$, said nozzles $14^b$ being arranged in pendent position at the spaced terminals $14^c$ of the stamping member. At points adjacent to the nozzles $14^b$ the spaced terminal portions of the stamping member 14 are provided with wiping wings 17 which are equipped with springs $17^a$ designed to press them toward and yieldingly retain them in the horizontal positions shown in Figures 16 and 28. It will also be noted here that when a package designated by 16 is forced upwardly between the terminal portions of the stamping member 14, the wings 17 will wipe over the end portions of a stamp, designated by $17^b$ as well as against the opposite sides of the package so as to contribute to the application of the stamp in adequate manner to the package. At its underside the stamping member 14 is provided with a carriage 18, slidably movable on a transverse bracket bar 19 which bar is appropriately fixed to the main frame. For the translation of the carriage 18 and stamping member 14 on the bar 19, I provide the connection best shown in Figures 1, 24, 25, 26 and 27, the said connection including a stud 20 on the carriage 18, an arm 22, Figures 1 and 22, provided with a slot 21 which receives said stud 20, and a lever 23 fixedly connected near its upper end to the arm 22 and also fixed to a rock shaft $23^x$ journaled in a frame portion $23^y$ and having at its inner end an arm 24 on which is an anti-friction roller 25 disposed in the groove $a$ of the cam 3. The cam 3 is rotated in the direction indicated by arrow and hence it will be apparent that coincident with the rotation of the said cam 3 the lever 23 will be rocked first in one direction and then in the other, the movements of the lever 23 being separated by intervals due to the arrangement of the anti-friction roller 25 in the concentric portion of the cam groove $a$, see Figures 24 to 26 and particularly Figure 24 which shows the lever 23 in the middle of its period of rest.

Also disposed in the groove $3^a$ of the cam 3 is an anti-friction roller 30 at the lower end of a reciprocatory rack bar 31, appropriately guided at 32 and equipped with upright spaced brushes $32^a$. The said brushes $32^a$ are spaced apart with their brush faces in opposed and spaced relation, and the said brushes $32^a$ are about as wide as the packages to be handled. Therefore, for the adequate connection of the brushes to the bar 31 we employ plates $32^b$ and $32^c$, bolts $32^d$ and nuts $32^e$ fixedly connecting the plates $32^b$ and $32^c$ and consequently the brushes together, bolts connecting the plates $32^b$ together, and spacing sleeves $32^c$ mounted on said bolts and interposed between the plates $32^b$. Appropriately supported and intermeshed with the rack bar 31 is a spur gear 33, and this spur gear 33 serves to transmit motion from the bar 31 to the package elevating bar 34 best shown in Figure 5, said bar 34 being appropriately guided at 35. It will be manifest from this construction that when the bar 31 and the brushes 32ª are moved upwardly, the bar 34 will be moved downwardly, and when the bar 31 is moved downwardly the bar 34 will be moved upwardly.

Normally resting on the roller 6 so as to receive glue therefrom is a comparatively smaller roller 7 the function of which is to apply glue to the stamps one by one. The said roller 7 is mounted between arms 7ª on a rock shaft 7ᵇ, Figures 1 and 19, and at its end remote from the arms 7ª, the rock shaft 7ᵇ is provided with an arm 7ᶜ on which is a horizontally disposed anti-friction roller 7ᵈ which normally rests in an opening 7ᵉ in one wall of the guideway 5ᵉ so as to protrude into the guideway 5ᵉ and be forced outwardly by each package as it traverses the guideway 5ᵉ for a purpose hereinafter described.

At 15 is the upright holder for stamps 17ᵇ, the said holder being provided near its upper end with barbs 41 and being also provided with a side door 42 which carries some of the barbs and is hinged at 43 and designed to be held yieldingly in close position by a latch 44, Figure 8. The stamps 17ᵇ are arranged one above the other in the holder 15, Figure 7 and are superimposed on a follower 45 provided with a pendent rod 46 which extends through the lower end of the holder. At its lower end the said rod 46 is provided with an enlargement or arm 47 to which is connected one end of a cable 48. This cable 48 is trained over a shaft 49 on the holder 15 and is equipped at its lower end with a weight 49ª. Manifestly the gravitational action of the weight 49ª will tend to yieldingly press the follower 45 and the superimposed stamps 17ᵇ upwardly in the holder and against the before mentioned barbs 41. For the purpose of preventing too free upward movement of the follower 45 and the stamps on said follower when but a few stamps are left in the holder 15 we provide the tension spring 50, arranged in the holder 15 near the upper end thereof, and subject to the regulating screw 51, Figure 9.

The stamp holder 15 is movable vertically and is guided in such movements on the vertically disposed portion 52 of a bracket fixed to the main frame of the machine, the said bracket portion 52 being straddled by straps 53 fixed to one side of the holder 15. At one side the stamp holder 15 is provided with a stud 54 which is engaged by the bifurcated end of a lever 55. The said lever 55 is fulcrumed at an intermediate point of its length of a stationary support, as indicated by 56, and its arm ajacent to the stamp holder 15 is connected to a retractile spring 57 which tends to move said arm upwardly. On its other arm the lever 55 is provided with an anti-friction roller 58. Manifestly when the said roller 58 suddenly sinks in the peripheral depression 3ᵉ of the cam 3, the spring 57 which is connected at its upper end to a portion of the machine frame will suddenly move the stamp holder 15 upwardly. Then as the depression 3ᵉ is moved out of engagement with the anti-friction roller 58, the periphery of the cam 3 will rock the lever 55 and move the stamp holder 15 downwardly, and said holder 15 will remain in its lower position during the major portion of the revolution of the cam 3 until the depression 3ᵉ is again presented to the anti-friction roller 58 when the holder 15 will again be suddenly moved upward. In the construction thus far described in detail, the miter gear 2ᵐ is fixed on the countershaft 2, and the vertically disposed shaft 2ᵖ is journaled in a fixed portion of the frame upright b. When deemed expedient by the manufacturer the construction shown in Figures 30 and 31 may be used in lieu of the mentioned construction shown in Figure 1 and described as supported by the frame upright b. In the modified construction we provide a frame upright b' with an undercut guideway b² we arrange a carriage b³, designed to be adjustably fixed with respect to the frame upright b' through the medium of a set screw b⁴. Fixedly connected to the said carriage b³ is a bracket b⁵ which bracket b⁵ carries a miter gear 2ᵐ splined at b⁶ on the countershaft 2, and also carries a vertical shaft 2ᵖ with a complete miter gear 2ⁿ at its lower end and a mutilated miter gear 4 at its upper end, said gear 4 being intermeshed with a mutilated gear 5 similar to that before described. It frequently happens that when packages of cigarettes become damp they swell so that they are increased in width, and when this condition is encountered it may be taken care of by adjusting the said bracket b⁵, and adjusting in corresponding manner the bracket which carries the idler sprocket 50ᶜ.

As hereinbefore indicated our novel machine is designed primarily for applying revenue stamps to cigarette packages in such manner as to utilize the revenue stamps in the sealing of the packages, and in the operation of the machine the cigarette packages are placed by hand one by one in the guideway 5ᵃ and in front of the rear follower finger 5ᵈ that it is at that time traversing the said guideway 5ᵉ. When they come to the operator at our novel machine the packages are open at one end, having been opened by an inspector whose province it is to see that each package contains a full quota of cigarettes. Therefore, as each package advances or is advanced in the guideway 5ᵉ the extended part of the tinfoil of the package is first closed by the members 5ᵍ and 5ʰ in the manner hereinbefore described in detail. As each package encounters the antifriction roller 7ᵈ it operates to rock the shaft 7ᵇ and raise the comparatively small roller 7 so that said roller 7 will be in position to apply glue to a stamp as said stamp is carried across the roller 7 by movement of the stamping member 14. When no package is in contact with the anti-friction roller 7ᵈ, the roller 7 by gravitational action will be carried into contact with the roller 6 so as to receive from the latter a fresh supply of glue. The packages are moved one in front of the other in the guideway 5ᵉ toward the right in Figure 1, and each package is engaged by the follower finger 5ᵈ behind it until the said follower finger 5ᵈ swings below the bottom wall of the guideway 5ᵉ. It is because of this that the adjustable provision illustrated in Figures 30 and 31 is made use of when conditions require. In the manner described each package is positioned below the path of movement of the stamping member 14, and at said time the stamping member 14 will have taken up by suction the uppermost stamp in the holder 15 and will have moved with the adhering stamp to a position above the path of movement of the package. In its traverse from a position above the stamp holder 15 to a position above the package the stamp will have been supplied with glue by its movement over the roller 7. When the glued stamp adhering to the member 14 is positioned above the package in the guideway, the package is forced upwardly by the bar 34 between the terminal portions of the member 14 and also between the wings 17, and coincident with the upward movement of the bar 34 and package the brushes 32ᵃ are moved downwardly so that the package will be received and held between the lower portions of the said brushes as shown by dotted lines in Figure 25. On the said upward movement of the package, the wings 17 will operate to draw the stamp taut over the end of the package and press the end portions of the stamp against the opposed sides of the package so as to contribute to the fastening of the stamp end portions to the package, after which the brush bristles will further press the stamp end portions against opposite sides of the package and thereby add to the security of the adhesive connection of the stamp to the package. On the subsequent upward movement of the brushes 32ᵃ and downward movement of the follower bar 34, the brushes will operate to raise the mentioned package clear of the path of movement of the stamping member 14. We would also have it understood at this point, that at the time the stamping member 14 is above the stamp holder 15 the said holder 15 is suddenly thrust upwardly and downwardly by the means hereinbefore described in detail with a view to pressing the uppermost stamp in the holder against the nozzles 14ᵇ of the stamping member 14 and thereby assuring adherence of the uppermost stamp only to the member 14 under the suction before alluded to.

The operation described is repeated in the stamp affixing and sealing of the second package, and when this second package is thrust upwardly between the brushes 32ᵃ it moves the first package before it. In this way the packages are moved in series upwardly between the brushes 32ᵃ which serve by pressing the stamp end portions against the packages to assist in the setting of the glue and to assure the strong adherence of the stamp to the packages, and eventually the uppermost package is ejected from between the upper ends of the brushes.

The timing of the working parts controlled by the cam 3 is clearly brought out in Figures 24 to 27, inclusive, and it is therefore unnecessary to describe the same except to call attention to the fact that the bar 34 and the brushes 32ᵃ are at rest during a part of the translation or reciprocation of the stamping member 14; that the stamping member 14 is at rest during a part of the reciprocation of the bar 34 and brushes 32; and that the quick upward and downward movements of the stamp holder 15 are caused to take place coincident with a brief dwell of the stamping member 14 between the outward traverse and the inward traverse of said member.

On the upward movement of the piston 10 in cylinder 11 which takes place coincident with the upward movement of a package between the terminal portions of the member 14, a blast of air is forced against the stamp which assures the stamp leaving the member 14.

The term "stamp" as herein employed is intended to comprehend a revenue or other stamp as well as a sealing strip other than a stamp, of paper or other material compatible with the purpose of a sealing strip.

While we have entered into a detailed description of the parts comprised in the present preferred embodiment of our invention, we do not desire to be understood as confining ourselves to the specific construction disclosed herein, but on the other hand depend upon our appended claims to define our real invention and determine the measure of the protection granted us.

Having described our invention, what we claim and desire to secure by Letters-Patent, is:—

1. A sealing machine comprising means for placing packages successively in sealing position, means for closing the packages successively en route to said position, a movable stamp holder spaced from said position, brushes with a space between them coincident with said position, movable adhesive-applying means located between said position and the stamp holder, means for moving said adhesive-applying means, a package mover movable coincident with said position, stamping means movable to and fro between said position and a position opposite said stamp holder, means for moving the stamp-holder relative to the stamping means when the latter is opposite the holder, means for moving the package mover, and means for moving the stamping means.

2. A sealing machine comprising means for placing packages successively in sealing position, means for closing the packages successively en route to said position, a movable stamp holder spaced from said position, brushes with a space between them coincident with said position, movable adhesive-applying means located between said position and the stamp holder, means for moving said adhesive-applying means, a package mover movable coincident with said position, stamping means movable to and fro between said position and a position opposite said stamp holder, means for moving the stamp-holder relative to the stamping means when the latter is opposite the holder, means for moving the package mover, and means for moving the stamping means; the said stamping means including air-drawing and forcing mechanism.

3. A sealing machine comprising means for placing packages successively in sealing position, means for closing the packages successively en route to said position, a movable stamp holder spaced from said position, brushes with a space between them coincident with said position, movable adhesive-applying means located between said position and the stamp holder, means for moving said adhesive-applying means, a package mover movable coincident with said position, stamping means movable to and fro between said position and a position opposite said stamp holder, means for moving the stamp-holder relative to the stamping means when the latter is opposite the holder, means for moving the package mover, and means for moving the stamping means; the said stamping means including wipers for pressing a stamp against a package when the latter is en route from said position to a position between the brushes.

4. A sealing machine comprising means for placing packages successively in sealing position, means for closing the packages successively en route to said position, a movable stamp holder spaced from said position, brushes with a space between them coincident with said position, movable adhesive-applying means located between said position and the stamp holder, means for moving said adhesive-applying means, a package mover movable coincident with said position, stamping means movable to and fro between said position and a position opposite said stamp holder, means for moving the stamp-holder relative to the stamping means when the latter is opposite the holder, means for moving the package mover, and means for moving the stamping means; the said stamping means including air-drawing and forcing mechanism, and also including wipers for pressing a stamp against a package when the latter is en route from said position to a position between the brushes.

5. A sealing machine comprising means for placing packages successively in sealing position, a movable stamp holder spaced from said position, brushes with a space between them coincident with said position, movable adhesive-applying means located between said position and the stamp holder, means for moving said adhesive-applying means, a package mover movable coincident with said position, stamping means movable to and fro between said position and a position opposite said stamp holder, means for moving the stamp-holder relative to the stamping means when the latter is opposite the holder, means for moving the package mover, and means for moving the stamping means.

6. A sealing machine comprising means for placing packages successively in sealing position, a movable stamp holder spaced from said position, brushes with a space between them coincident with said position, movable adhesive-applying means located between said position and the stamp holder, means for moving said adhesive-applying means, a package mover movable coincident with said position, stamping means movable to and fro between said position and a position opposite said stamp holder, means for moving the stamp-holder relative to the stamping means when the latter is opposite the holder, means for moving the package mover, and means for moving the stamping means; the said stamping means including air-drawing and forcing mechanism.

7. A sealing machine comprising means for placing packages successively in sealing position, a movable stamp holder spaced from said position, brushes with a space between them coincident with said position, movable adhesive-applying means located between said position and the stamp holder, means for moving said adhesive-applying means, a package mover movable coincident with said position, stamping means movable to and fro between said position and a position opposite said stamp holder, means for moving the stamp-holder relative to the stamping means when the latter is opposite the holder, means for moving the package mover, and means for moving the stamping means; the said stamping means including wipers for pressing a stamp against a package when the latter is en route from said position to a position between the brushes.

8. A sealing machine comprising means for placing packages successively in sealing position, a movable stamp holder spaced from said position, brushes with a space between them coincident with said position, movable adhesive-applying means located between said position and the stamp holder, means for moving said adhesive-applying means, a package mover movable coincident with said position, stamping means movable to and fro between said position and a position opposite said stamp holder, means for moving the stamp-holder relative to the stamping means when the latter is opposite the holder, means for moving the package mover, and means for moving the stamping means; the said stamping means including air-drawing and forcing mechanism and also including wipers for pressing a stamp against a package when the latter is en route from said position to a position between the brushes.

9. A sealing machine comprising means for placing packages successively in sealing position, a movable stamp holder spaced from said position, movable brushes with a space between them coincident with said position, movable adhesive-applying means located between said position and the stamp holder, means for moving said adhesive-applying means, a package mover movable coincident with said position, stamping means movable to and fro between said position and a position opposite said stamp holder, means for moving the stamp-holder relative to the stamping means when the latter is opposite the holder, means for moving the brushes, means for moving the package mover, and means for moving the stamping means; the means for moving the stamp-holder, brushes and package-mover including a rotary cam.

10. A sealing machine comprising means for placing packages successively in sealing position, means for closing the packages successively en route to said position, a movable stamp holder spaced from said position, movable brushes with a space between them coincident with said position, movable adhesive-applying means located between said position and the stamp holder, means for moving said adhesive-applying means, a package mover movable coincident with said position, stamping means movable to and fro between said position and a position opposite said stamp holder, means for moving the stamp holder relative to the stamping means when the latter is opposite the holder, means for moving the brushes, means for moving the package mover, and means for moving the stamping means; the means for moving the stamp holder, brushes and package mover including a rotary cam.

11. A sealing machine comprising means for placing packages successively in sealing position, a movable stamp holder spaced from said position, movable brushes with a space between them coincident with said position, movable adhesive-applying means located between said position and the stamp holder, means for moving said adhesive-applying means, a package mover movable coincident with said position, stamping means movable to and fro between said position and a position opposite said stamp holder, means for moving the stamp holder relative to the stamping means when the latter is opposite the holder, means for moving the brushes, means for moving the package mover, and means for moving the stamping means; the brushes and the package mover being simultaneously moved in opposite directions.

12. A sealing machine comprising means for placing packages successively in sealing position, means for closing the packages successively en route to said position, a movable stamp holder spaced from said position, movable brushes with a space between them coincident with said position, movable adhesive-applying means located between said position and the stamp holder, means for moving said adhesive-applying means, a package mover movable coincident with said position, stamping means movable to and fro between said position and a position opposite said stamp holder, means for moving the stamp-holder relative to the stamping means when the latter is opposite the holder, means for moving the brushes, means for moving the package mover, and means for moving the stamping means; the brushes and the package mover being simultaneously moved in opposite directions.

13. A sealing machine comprising means for placing packages successively in sealing position, a movable stamp holder spaced from said position, movable brushes with a space between them coincident with said position, movable adhesive-applying means located between said position and the stamp holder, means for moving said adhesive-applying means, a package mover movable coincident with said position, stamping means movable to and fro between said position and a position opposite said stamp holder, means for moving the stamp-holder relative to the stamping means when the latter is opposite the holder, means for moving the brushes, means for moving the package mover, and means for moving the stamping means; the means for moving the stamp-holder, brushes and package-mover including a rotary cam, and the brushes and the package mover being simultaneously moved in opposite directions.

14. A sealing machine comprising means for placing packages successively in sealing position, means for closing the packages successively en route to said position, a movable stamp holder spaced from said position, movable brushes with a space between them coincident with said position, movable adhesive-applying means located between said position and the stamp holder, means for moving said adhesive-applying means, a package mover movable coincident with said position, stamping means movable to and fro between said position and a position opposite said stamp holder, means for moving the stamp-holder relative to the stamping means when the latter is opposite the holder, means for moving the brushes, means for moving the package mover, and means for moving the stamping means; the means for moving the stamp-holder, brushes and package-mover including a rotary cam, and the brushes and the package mover being simultaneously moved in opposite directions.

15. In a sealing machine, an organized mechanism comprising a cam, and a movable stamp holder, movable stamping member, movable brushes and movable package mover, all controlled and operable by said cam, and the brushes and package mover being simultaneously movable in opposite directions.

16. In a sealing machine, a package mover movable coincident with the position in which a package is placed for sealing, movable brushes separated by an intervening space coincident with said position, and means for simultaneously moving said package-mover and brushes in opposite directions.

17. In a sealing machine, a package mover movable coincident with the position in which a package is placed for sealing, movable brushes separated by an intervening space coincident with said position, a cam, a connection between the brushes and the cam for moving the former by the latter, and means between said connection and the package mover for moving said package mover simultaneously with and in reverse direction to the brushes.

18. In a sealing machine, a package mover movable coincident with the position in which a package is placed for sealing, movable brushes separated by an intervening space coincident with said position, a movable stamping member, and a cam and connections for moving brushes and package-mover simultaneously in opposite directions and for moving the stamping member away from and toward said position.

19. In a sealing machine, a package mover movable coincident with the position in which a package is placed for sealing, movable brushes separated by an intervening space coincident with said position, a movable stamp holder spaced from said position, and a cam and connections for simultaneously moving the package-mover and brushes in opposite directions, moving the stamping member to and fro between said position and a position opposite the stamp holder, and moving said stamp holder.

20. In a package sealing machine, the combination of reciprocatory brushing means, a cam, a rack bar connection between said means and the cam for operating the former by the latter, a package-mover comprising a rack, and a spur gear interposed between and meshed with said rack bar and rack.

21. In a sealing machine, the combination of a rotary cam having a side groove and a peripheral depression, reciprocatory brush means connected with the groove of the cam for operation thereby, a package mover operable from said connection and reversely to said brush means, a movable stamping member connected with the groove of the cam for operation thereby, a package mover operable from said connection and reversely to said brush means, a movable stamping member connected with the groove of the cam for operation thereby, a stamp holder, and means for moving said holder, controlled by the cam and the peripheral depression thereof.

22. In a sealing machine, an organized mechanism including a package mover movable coincident with the position in which a package is placed for sealing, means for moving said package mover, brushes simultaneously movable in reverse direction to the package mover and separated by an intervening space coincident with said position, a movable stamp holder spaced from said position, means for moving said holder, a stamping member movable from said position to a position opposite the stamp holder and vice versa and adapted for the passage of a package through itself, and means for moving said stamping member.

23. In a sealing machine, an organized mechanism including a package mover movable coincident with the position in which a package is placed for sealing, means for moving said package mover, brushes simultaneously movable in reverse direction to the package mover and separated by an intervening space coincident with said position, a movable stamp holder spaced from said position, means for moving said holder, a stamping member movable from said position to a position opposite the stamp holder and vice versa and adapted for the passage of a package through itself, and means for moving said stamping member; the said stamping member being of conduit formation and being associated with means for drawing and forcing air through it.

24. In a sealing machine, the combination of a frame, a primary drive shaft, a countershaft, selective means for driving the countershaft at different speeds from said drive shaft, a cam fixed to the countershaft, a crank disk also fixed to said shaft, means operable from the countershaft for placing packages successively in sealing position, a cylinder, a piston in said cylinder and connected with said crank disk, a movable stamp holder spaced from said position and operable by said cam, a movable adhesive applier located between said position and the stamp holder, means for moving said applier, a movable stamping member of conduit formation, a flexible conduit between said member and the cylinder, means operable by the cam, for moving said member to and fro, a package mover movable coincident with said position, brushes separated by a space coincident with said position, and means for operating said package mover.

25. In a sealing machine, the combination of a frame, a primary drive shaft, a countershaft, selective means for driving the countershaft at different speeds from said drive shaft, a cam fixed to the countershaft, a crank disk also fixed to said shaft, means operable from the countershaft for placing packages successively in sealing position, a cylinder, a piston in said cylinder and connected with said crank disk, a movable stamp holder spaced from said position and operable by said cam, a movable adhesive applier located between said position and the stamp holder, means for moving said applier, a movable stamping member of conduit formation, a flexible conduit between said member and the cylinder, means operable by the cam for moving said member to and fro, a package mover movable coincident with said position, brushes separated by a space coincident with said position, and means for operating said package mover and the stamping member being provided with hingedly mounted wipers for pressing against the package during movement thereof by the package mover.

26. A sealing machine comprising in an organized mechanism, package-moving means movable in coincidence with the position in which a package to be sealed is placed, means for moving said package-moving means, movable stamp-holding means spaced from said position, means for moving said stamp-holding means, brushes separated by a space in coincidence with said position, movable adhesive-applying means located between said position and the stamp-holding means, means for moving said adhesive-applying means, means for receiving a stamp from said stamp-holding means and carrying the stamp and holding the stamp opposite said position, and means for moving said stamp-receiving, carrying and holding means.

27. A sealing machine comprising in an organized mechanism, package-moving means movable in coincidence with the position in which a package to be sealed is placed, means for moving said package-moving means, movable stamp-holding means spaced from said position, means for moving said stamp-holding means, brushes separated by a space in coincidence with said position, movable adhesive-applying means located between said position and the stamp-holding means, means for moving said adhesive-applying means, means for receiving a stamp from said stamp-holding means and carrying the stamp and holding the stamp opposite said position, and means for moving said stamp-receiving, carrying and holding means; said means being of conduit formation and being combined with a flexible conduit and air drawing and forcing means.

28. A sealing machine comprising in an organized mechanism, package-moving means movable in coincidence with the position in which a package to be sealed is placed, means for moving said package-moving means, movable stamp-holding means spaced from said position, means for moving said stamp-holding means, brushes separated by a space in coincidence with said position, movable adhesive-applying means located between said position and the stamp-holding means, means for moving said adhesive-applying means, means for receiving a stamp from said stamp-holding means and carrying the stamp and holding the stamp opposite said position, and means for moving said stamp-receiving, carrying and holding means; said means being of conduit formation and being combined with a flexible conduit and air drawing and forcing means, and being equipped with wipers.

29. A stamping member of conduit formation having spaced terminal portions and nozzles thereon, in combination with wipers on said terminal portions, said wipers being hingedly mounted and associated with springs.

30. In a sealing machine, the combination of a package guideway with an opening in one side wall thereof, means for moving packages in said guideway, a rock shaft alongside the guideway and having an arm and a projection thereon adapted to protrude through said opening, an adhesive-applying roller connected with and movable by said rock shaft, and means for cooperating with said roller.

31. In a sealing machine, means for sealing packages when same are successively moved to position for sealing, said sealing means including a package mover movable coincident with said position, movable stamp holding and delivering means, and means for receiving a stamped and sealed package and moving it out of the path of the movable stamp holding and delivering means.

32. In a sealing machine, means for sealing packages when same are successively moved to position for sealing, said sealing means including a package mover movable coincident with said position, movable stamp holding and delivering means, and means for receiving a stamped and sealed package and moving it out of the path of the movable stamp holding and delivering means, said package receiving and moving means being in the form of spaced brushes.

In testimony whereof we affix our signatures.

JOHN D. SMITH.
CHARLES R. PHILLIPS.